United States Patent
Hsu (10) Patent No.: US 8,248,955 B2
(45) Date of Patent: Aug. 21, 2012

(54) SERIAL TRANSMISSION APPARATUS AND THE METHOD THEREOF

(75) Inventor: Hsiang Lin Hsu, Taoyuan County (TW)

(73) Assignee: StarChips Technology Inc., Hsin-Chu (TW)

( * ) Notice: Subject to any disclaimer, the term of this patent is extended or adjusted under 35 U.S.C. 154(b) by 423 days.

(21) Appl. No.: 12/651,610

(22) Filed: Jan. 4, 2010

(65) Prior Publication Data
US 2010/0172247 A1 Jul. 8, 2010

(30) Foreign Application Priority Data
Jan. 6, 2009 (TW) .............................. 98100143 A (51) Int. Cl.
*H04L 12/26* (2006.01)
(52) U.S. Cl. ...................................................... 370/242
(58) Field of Classification Search .................. 370/241, 370/242, 463; 710/62–72
See application file for complete search history.

(56) References Cited

U.S. PATENT DOCUMENTS

| 6,549,595 B1* | 4/2003 | Den Besten et al. .......... 375/360 |
| 2010/0231409 A1* | 9/2010 | Okada et al. ............. 340/825.21 |

* cited by examiner

*Primary Examiner* — Frank Duong
(74) *Attorney, Agent, or Firm* — WPAT, P.C.; Anthony King (57) ABSTRACT

Each of a plurality of serially-connected data transmission apparatuses comprises a first shift register, a fault-detecting circuit and a second shift register. The second shift register is configured to receive a second serial input signal and generate an output signal according to a clock signal. The fault-detecting circuit is configured to select one of the outputs of the second shift register and a first serial input signal based on the fault-detecting result. The first shift register is configured to receive the output of the fault-detecting circuit and generate an output according to the clock signal. The second serial input signal is equal to the first serial input signal of at least one preceding stage, and the first serial input signal is equal to the output serial signal of the preceding stage. One purpose of the present invention is to maintain continuous transmission of the serial data when a failure of the serially-connected data transmission apparatus occurs.

22 Claims, 9 Drawing Sheets

SERIAL TRANSMISSION APPARATUS AND THE METHOD THEREOF

BACKGROUND OF THE INVENTION

1. Field of the Invention

The present invention relates to a transmission apparatus, and more particularly, to a serial transmission apparatus and the signal transmission method thereof.

2. Description of the Related Art

The communication between controllers or between a controller and a peripheral device can be divided into classifications of parallel communication and serial communication, where the serial communication needs only three transmission wires (i.e., a clock signal wire, a data signal wire and a strobe signal wire) to complete the transmission. Usually, the transmission is done in such a manner that one data bit per clock cycle is serially transmitted to the destination device. When all serial data have been received by corresponding serially-connected data transmission apparatuses, the controller generates a strobe signal to latch a plurality of parallel output signals.

Figure 1A:
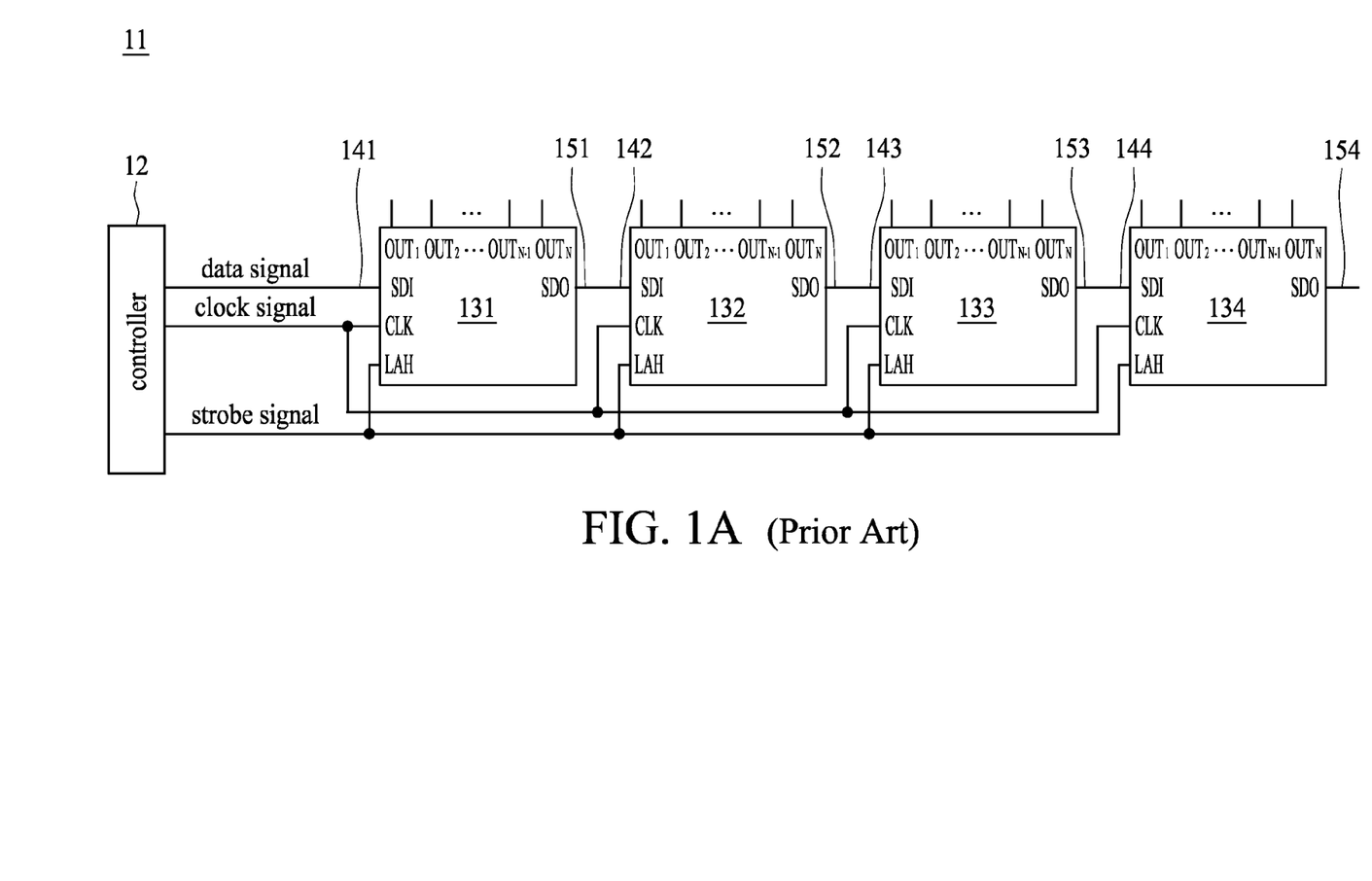
FIG. 1A shows a block diagram of a serial transmission apparatus of the prior art.
Figure 1B:
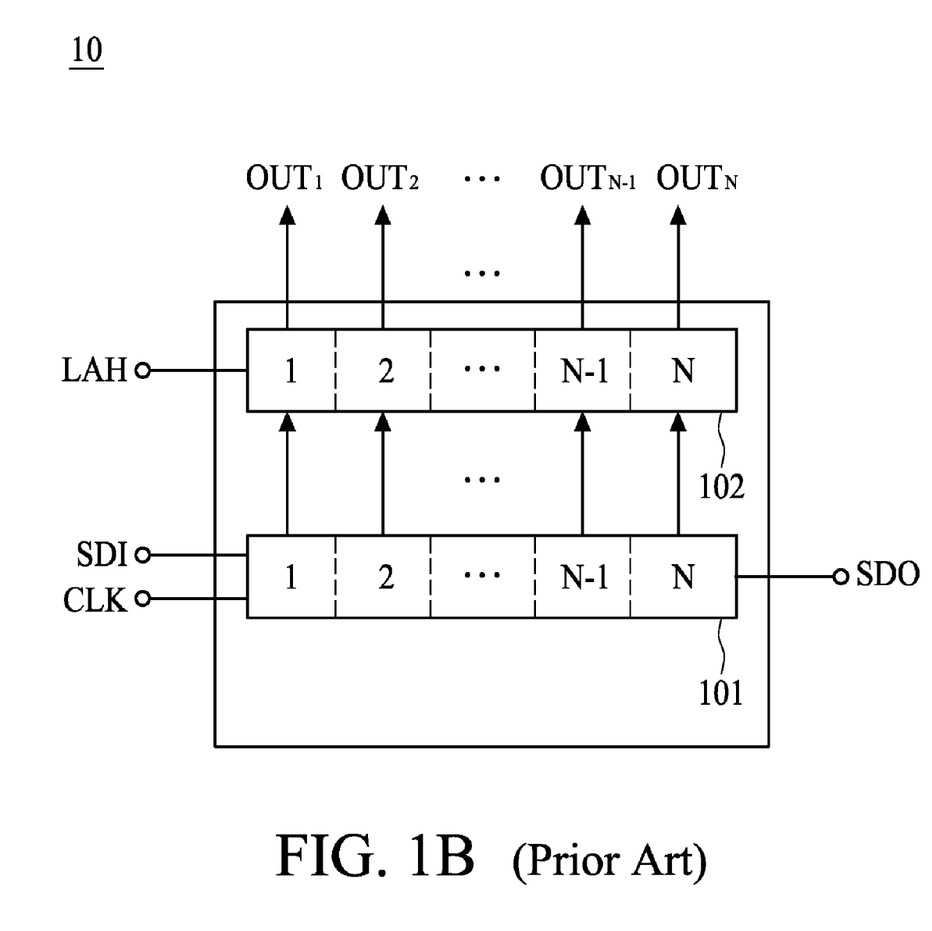
FIG. 1B shows the circuit diagram of a data transmission apparatus of the serial transmission apparatus of FIG. 1A.

Serial transmission communication can be applied to a wide variety of electronic devices, such as traffic signs or large-scale advertisement boards, by using LEDs as their light source. Large-scale advertisement boards are often comprised of tens of thousands LEDs, and thus need a plurality of serially-connected data transmission apparatuses to control the lighting information of the LEDs. Serial transmission can also be applied to local dimming technology to control LED backlight in a local area. FIG. 1A shows a block diagram of a conventional serial transmission apparatus and FIG. 1B shows the circuit diagram of each data transmission apparatus. Referring to FIG. 1B, the data transmission apparatus 10 has a clock signal CLK, a strobe signal LAH, a data input end SDI, a data output end SDO, and a plurality of parallel output ends $OUT_1, OUT_2, \ldots, OUT_N$. The data transmission apparatus 10 includes a shift register 101 and a latch 102. The shift register 101 includes an N-stage register for receiving serially-connected input data, where the first stage of the shift register 101 is connected to the input end SDI, and the last stage thereof is connected to the output end SDO. When a clock signal arrives at the clock end CLK, the shift register 101 shifts serial input data from SDI by one bit to the next stage of the shift register 101. The parallel output signals of the shift register 101 are latched in the corresponding latch 102 when the strobe signal LAH is enabled, and each output stage of the latch 102 is connected to corresponding output ends $OUT_1, OUT_2, \ldots, OUT_N$.

Figure 1C:
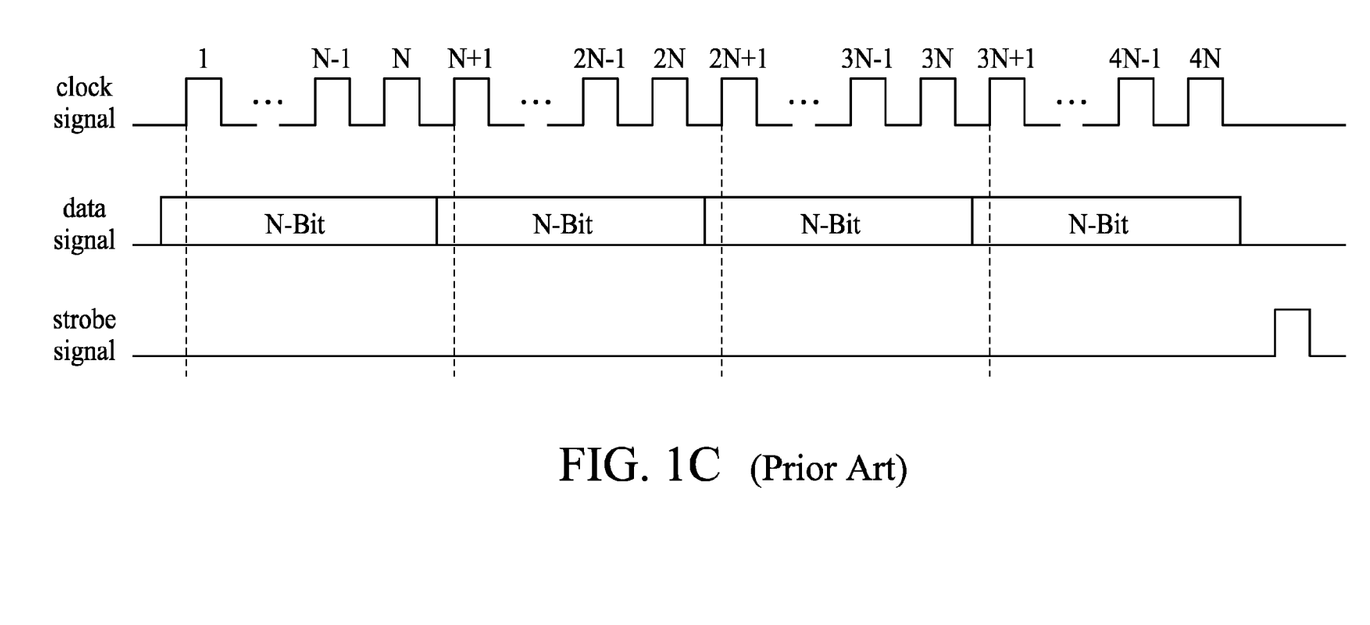
FIG. 1C shows a waveform diagram of input and output signals of the serially-connected data transmission apparatus of the prior art.

Referring to FIG. 1A, the serial transmission apparatus 11 includes four serially-connected data transmission apparatuses 131-134. Each of the serially-connected data transmission apparatuses 131-134 individually receives an input signal 141-144 and a clock signal, and individually provides one output signal 151-154. The data signal 141, clock signal and strobe signal received by the first data transmission apparatus 131 are provided by a controller 12. Because the output end of each data transmission apparatus 131-133 is coupled to the input end of the next data transmission apparatus 132-134, after the serial data signal output by the controller 12 is received by the first data transmission apparatus 131, the serial data signal propagates through each data transmission apparatus until it reaches the output end SDO. FIG. 1C shows waveforms of input and output signals of the serially-connected data transmission apparatus 11. Because each data transmission apparatus 131-134 includes a shift register 101, it can store N-bit input data. When the $N^{th}$ clock signal arrives at the clock end CLK, N data bits are stored in the shift register 101 of the first data transmission apparatus 131. Subsequently, when the $2N^{th}$ clock signal arrives at the clock end CLK, the N data bits are stored in the shift register 101 of the first and second data transmission apparatuses 131, 132. Finally, when the $4N^{th}$ clock signal arrives at the clock end CLK, the N data bit are stored in the shift register 101 of each data transmission apparatus 131-133. After the strobe signal LAH is triggered, the data bit stored in the shift register is synchronously latched in corresponding latch 102, and then output in parallel to output ends $OUT_1, OUT_2, \ldots, OUT_N$ of the corresponding data transmission apparatus 131-133. As mentioned above, the conventional serial transmission apparatus 11 can transmit larger amounts of data by increasing the number of serially-connected data transmission apparatuses.

However, if one element of the serial transmission apparatus 11 is out of order, the serial transmission data is held and fails to reach the output end. For example, when the serial transmission apparatus is applied to a large-scale advertisement board, any failure in any stage of the serial transmission apparatus will result in an incomplete display and the image thereon will be difficult to recognize. More importantly, if the serial transmission apparatus is applied to a traffic sign or a transaction display device, a failure in serial transmission could result in injury or loss of property. In addition, when a serial transmission is used to adjust an LED backlight module, any malfunction in the transmission apparatus may result in an entire failure of the LED backlight module. To address such issues, the present invention provides a serial transmission apparatus and method thereof to avoid any interruption in transmission.

SUMMARY OF THE INVENTION

The serial transmission apparatus in accordance with one embodiment of the present invention comprises a plurality of serially-connected data transmission apparatuses, and each of the data transmission apparatuses comprises a second shift register, a fault-detecting circuit and a first shift register. The second shift register is configured to receive a second serial input signal and generate an output signal in accordance with a clock signal. The fault-detecting circuit is configured to receive an output signal of the second shift register and a first serial input signal, and to select one of the output signals of the second shift register and the first serial input signal in accordance with a fault-detecting result so as to generate an output signal. The first shift register is configured to receive the output signal of the fault-detecting circuit and generate a serial output signal in accordance with the clock signal. The second serial input signal is derived from the first serial input signal of a preceding data transmission apparatus, and the first serial input signal is derived from the serial output signal of the immediately preceding data transmission apparatus.

The serial transmission apparatus in accordance with one embodiment of the present invention comprises a plurality of serially-connected data transmission apparatuses, and each of the data transmission apparatuses comprises a first shift register, a second shift register and a fault-detecting circuit. The first shift register is configured to receive a first serial input signal and generate a serial output signal in accordance with a clock signal. The second shift register is configured to receive a second serial input signal and generate a second serial output signal in accordance with a clock signal. The fault-detecting circuit is configured to receive the output signals of the first and second shift registers, and to select one of the output signals of the first and second shift registers in accordance with a fault-detecting result so as to generate a serial output signal. The first serial input signal is derived from the first serial output signal of a preceding data transmission apparatus, and the second serial input signal is derived from the second serial output signal of a succeeding data transmission apparatus.

The method for serially transmitting signals in accordance with one embodiment of the present invention comprises the steps of: providing a plurality of serially-connected data transmission apparatuses, wherein each of the data transmission apparatuses includes a first serial data input port and a second serial data input port; outputting direct serial data from an immediately preceding data transmission apparatus to a first serial data input port of a current data transmission apparatus; inputting direct serial data from a preceding data transmission apparatus to a second serial data input port of the current data transmission apparatus; utilizing a fault-detecting circuit to compare data at the first serial data input port and data at the second serial data input port, and selecting data from the first serial data input port or data from the second serial data input port in accordance with the fault-detecting result to generate a serial output signal to act as a serial input signal of the current data transmission apparatus; and generating parallel output signals by the data transmission apparatus to drive a light emitting diode unit.

The method for serially transmitting signals in accordance with one embodiment of the present invention comprises the steps of: providing a plurality of serially-connected data transmission apparatuses, wherein each of the data transmission apparatuses includes a first serial data input port and a second serial data input port; forwarding direct serial data from a preceding data transmission apparatus to a first serial data input port of a current data transmission apparatus; forwarding inverse serial data from a succeeding data transmission apparatus to a second serial data input port of the current data transmission apparatus; utilizing a fault-detecting circuit to compare data at the first serial data input port and data at the second serial data input port, and selecting data from the first serial data input port or data from the second serial data input port in accordance with the fault-detecting result; and generating a parallel output signal to drive a light emitting diode unit.

BRIEF DESCRIPTION OF THE DRAWINGS

The invention will be described according to the appended drawings in which.

PREFERRED EMBODIMENT OF THE PRESENT INVENTION

Figure 2A:
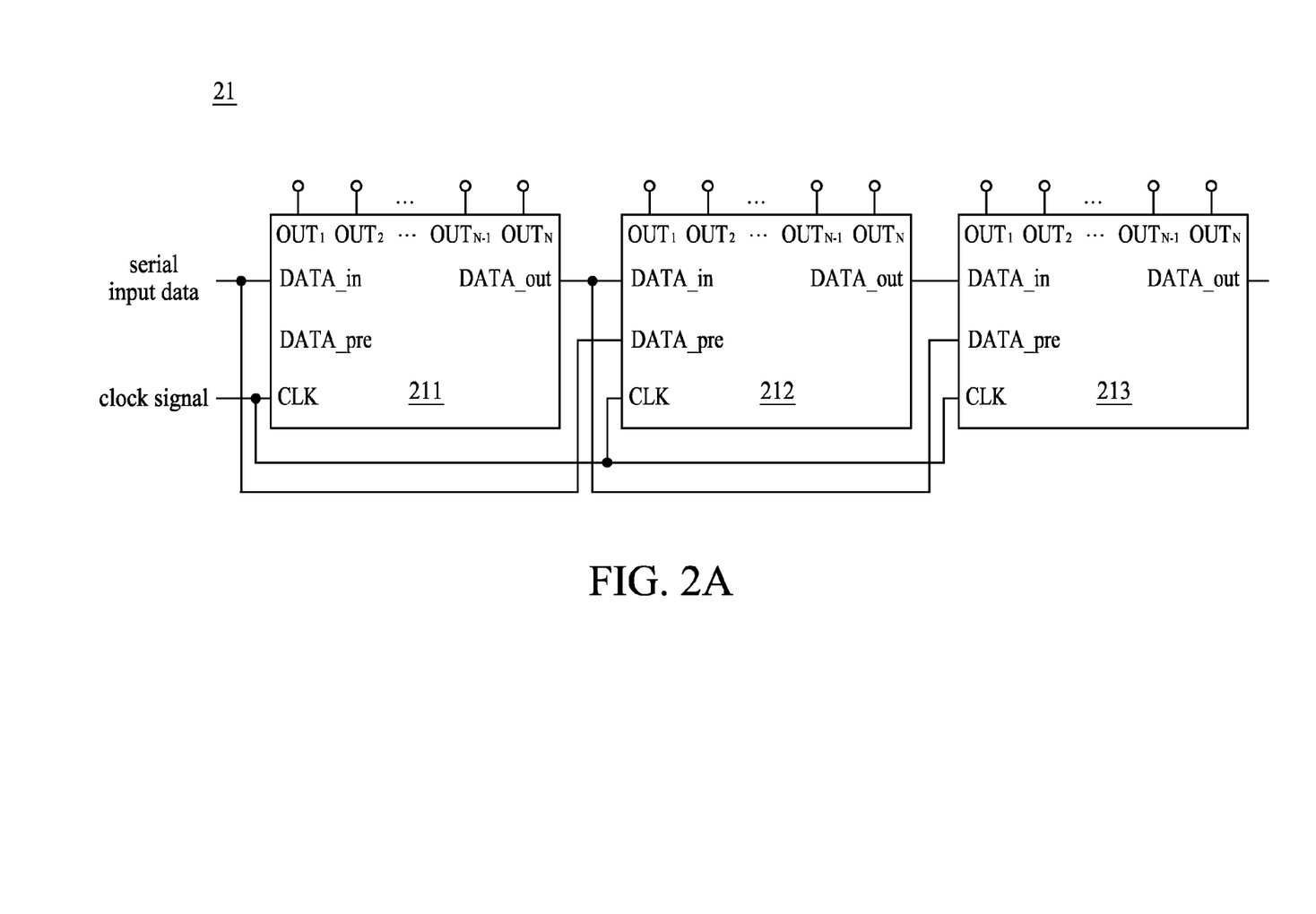
FIG. 2A shows a block diagram of the serial transmission apparatus in accordance with one embodiment of the present invention.
Figure 2B:
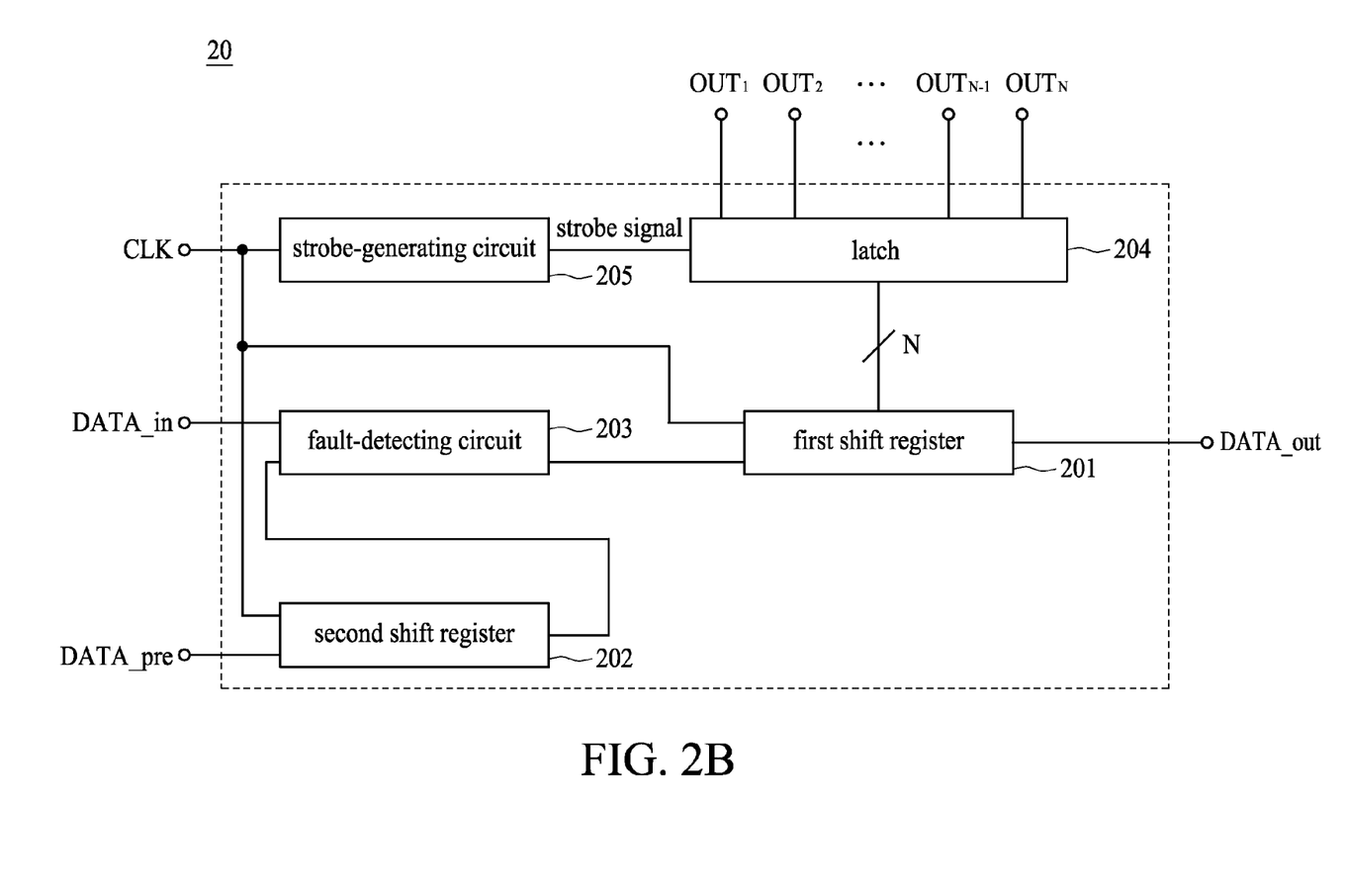
FIG. 2B shows a circuit diagram of a data transmission apparatus of the serial transmission apparatus in accordance with one embodiment of the present invention.

FIG. 2A shows a block diagram of the serial transmission apparatus in accordance with one embodiment of the present invention. For the purpose of concision, a three-stage serial transmission apparatus is exemplified. FIG. 2B shows a circuit diagram of each data transmission apparatus.

Referring to FIG. 2B, the data transmission apparatus 20 includes a clock signal CLK, a first input end DATA_in, a second input end DATA_pre, a first output end DATA_out and a plurality of parallel output ends $OUT_1, OUT_2, \ldots, OUT_N$. In this embodiment, the data transmission apparatus 20 includes a first shift register 201, a second shift register 202, a fault-detecting circuit 203, a latch 204 and a strobe-generating circuit 205. The serial transmission apparatus 20 functions as follows. First, a serial input data is received by the first input end DATA_in of a first data transmission apparatus 211, and the first serial input data is transmitted to the fault-detecting circuit 203 of the first data transmission apparatus 211. Meanwhile, the serial input data is received by the second input end DATA_pre of a second data transmission apparatus 212, and transmitted to the fault-detecting circuit 203 of the second data transmission apparatus 212. When the $N^{th}$ clock signal reaches the clock end CLK of the first data transmission apparatus 211, the serial input data is passed through the first shift register 201 of the first data transmission apparatus 211, and then enters the first input end DATA_in of the second data transmission apparatus 212. The output signal of the first shift register 201 simultaneously enters the second input end DATA_pre of a third data transmission apparatus 213.

In this embodiment, the fault-detecting circuit 203 of the data transmission apparatus 211-213 has two input ends. For example, one input end of the second data transmission apparatus 212 is used to receive the data bit of the first output end DATA_out of the first data transmission apparatus 211, and the other input end is used to receive output signals of the second shift register 202 of the second data transmission apparatus 212. The second data transmission apparatus 212 selectively switches one of the two input ends to the first shift register 201. In this embodiment, the fault-detecting circuit 203 may be a bit comparator for determining whether data at two input ends have the same logical change. If the output signal of the second shift register 202 and the data of the first input end DATA_in do not have the same logical change, the fault-detecting circuit 203 selects the output signal of the second shift register 202. In another embodiment, the fault-detecting circuit 203 can be a pulse edge detector for detecting logical change of the first output end DATA_out of the first data transmission apparatus 211. Because the serial input data is assembled by a plurality of logic values 0 and 1, if the transmission is normal, the fault-detecting circuit 203 can detect edge change from logic 0 to 1, or from logic 1 to 0. When the fault-detecting circuit 203 reads a sequence of continuous repetitions of logic 0 or logic 1, it detects occurrence of a stuck-open or stuck-short situation or a failure in the transmission. Under such case, the fault-detecting circuit 203 selectively switches to receive the data bit of the second shift register 202 of the data transmission apparatus 212, and bypasses failure information of the first output end DATA_out of the preceding data transmission apparatus 211. When the transmission is normal, the fault-detecting circuit 203 selectively switches to receive the data bit of the first output end DATA_out of the preceding data transmission apparatus 211 as the input signal of the first shift register 201. By the above operations, when a serial transmission apparatus fails, the serial input data can bypass the failure point and transmission of data is continued.

Figure 2C:
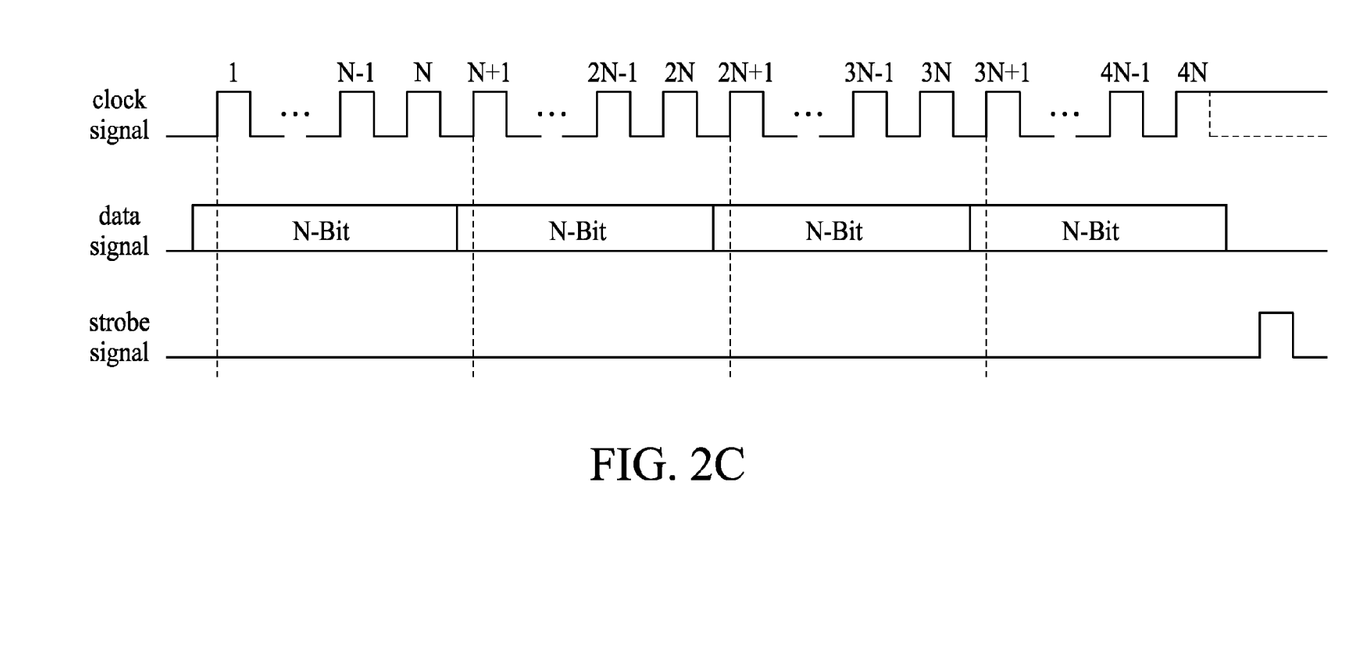
FIG. 2C shows a waveform diagram of input and output signals of the serial transmission apparatus in accordance with one embodiment of the present invention.

FIG. 2C shows waveforms of input and output signals of the serial transmission apparatus 21. In this embodiment, the strobe signal for latching the data bit of the first shift register 201 to a corresponding latch 204 is generated by the strobe-generating circuit 205. The strobe-generating circuit 205 receives the clock signal CLK first, and the clock signal CLK remains at a specific level for a period after every bit of the serial data is stored in the corresponding shift register. After the strobe-generating circuit 205 detects a signal remaining at a specific level for a predetermined period, a pulse signal is generated to act as the strobe signal. In another embodiment, the strobe signal may be an exterior signal.

In accordance with one embodiment of the present invention, the second input end DATA_pre of the data transmission apparatus 213 is used to receive data at the first input end DATA_in of the data transmission apparatus 212. In accordance with another embodiment, the second input end DATA_pre of the data transmission apparatus 213 is used to receive data at the first input end DATA_in of the data transmission apparatus 211 or data transmission apparatus at two or more previous stages (not shown) to increase the fault tolerance capability.

Figure 3A:
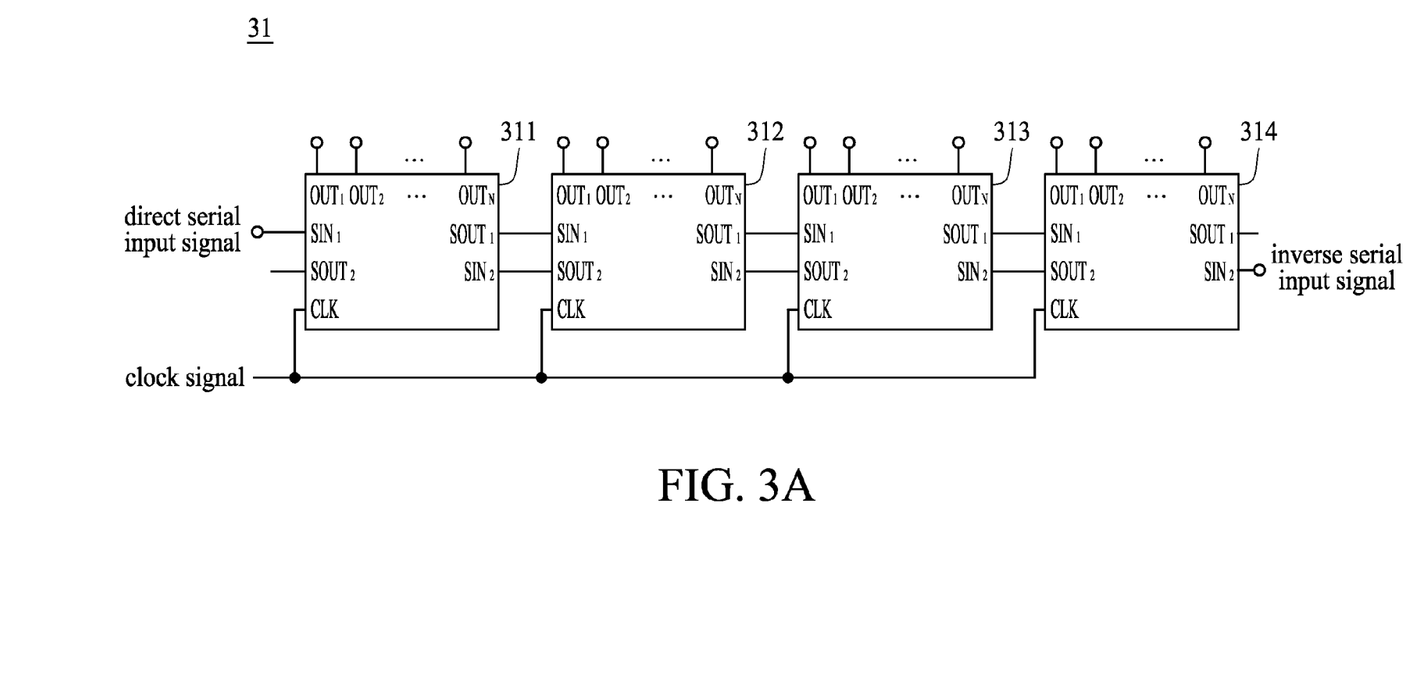
FIG. 3A shows a block diagram of the serial transmission apparatus in accordance with one embodiment of the present invention.
Figure 3B:
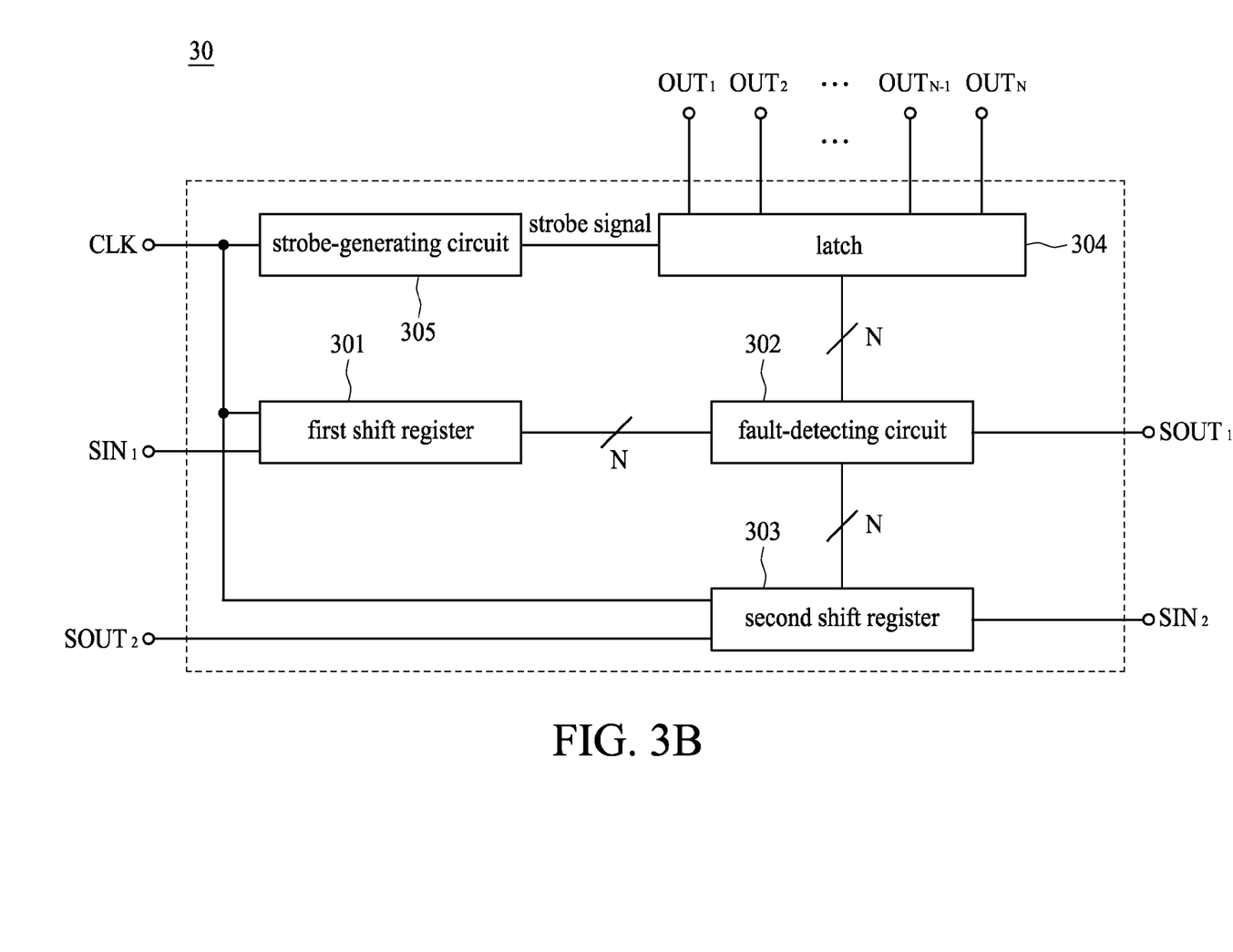
FIG. 3B shows an internal circuit diagram of a data transmission apparatus of the serial transmission apparatus in accordance with one embodiment of the present invention.

FIG. 3A shows a block diagram of the serial transmission apparatus 31 in accordance with one embodiment of the present invention, in which the serial transmission apparatus 31 includes a plurality of serially-connected data transmission apparatuses. For the purpose of concision, a four-stage serial transmission apparatus is exemplified. FIG. 3B shows an internal circuit diagram of a data transmission apparatus.

The data transmission apparatus 31 includes a clock signal CLK, a first input end $SIN_1$, a second input end $SIN_2$, a first output end $SOUT_1$, a second output end $SOUT_2$ and a plurality of parallel output ends $OUT_1, OUT_2, \ldots, OUT_N$. In this embodiment, the data transmission apparatus includes a first shift register 301, a fault-detecting circuit 302, a second shift register 303, a latch 304 and a strobe-generating circuit 305. The first shift register 301 is used to receive signals from the first input end $SIN_1$, while the second shift register 303 is used to receive signals from the second input end $SIN_2$. The fault-detecting circuit 302 has two input ends, where one input end receives the output signal of the first shift register 301, while the other input end receives the output signal of the second shift register 303, and selectively switches one of the two input ends to be latched in a corresponding latch 304 when a strobe signal is triggered. Every stage of the latch 304 is electrically connected to parallel output ends $OUT_1, OUT_2, \ldots, OUT_N$, thereby transforming serial input data into parallel output format. The strobe-generating circuit 305 is used to detect when a signal remains at a specific level for a period, and then generates the strobe signal.

The serially-connected transmission apparatus 31 functions as follows. First, a direct serial input data is received by the first input end $SIN_1$ of a data transmission apparatus 311, and is then transmitted to the first shift register 301 of the data transmission apparatus 311. Another inverse serial input data is received by the second input end $SIN_2$ of a data transmission apparatus 314, and is then transmitted to the second shift register 303 of the data transmission apparatus 314. The data bit of the inverse serial input data is transmitted in a direction inverse to that of the direct serial input data. For example, when the direct serial input data is (1, 1, 0, 0, 1, 1, 0), the inverse serial input data is (0, 1, 1, 0, 0, 1, 1).

Figure 3C:
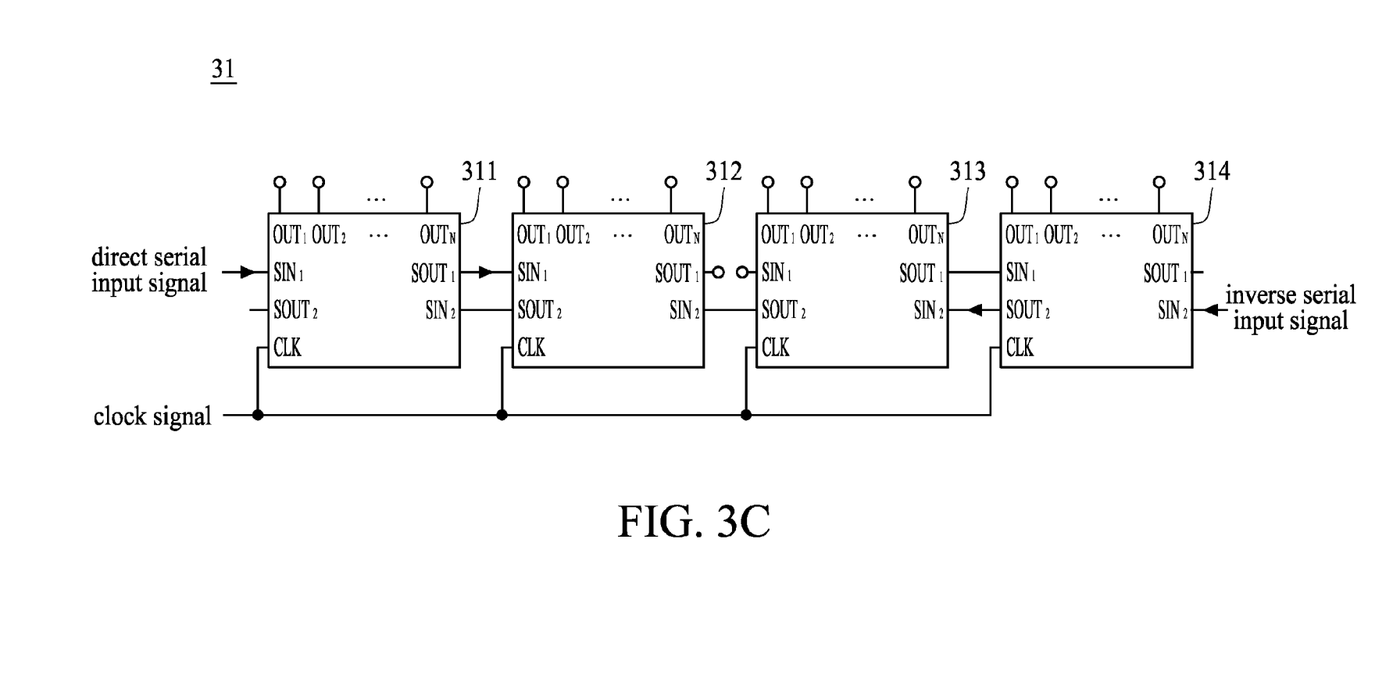
FIG. 3C shows a block diagram of an exemplary situation wherein a fault-detecting circuit responds to a stuck-short or stuck-open situation of the serial transmission apparatus in accordance with one embodiment of the present invention.

In this embodiment, the fault-detecting circuit 302 of each data transmission apparatus 311-314 is a bit comparator, which is used to determine whether two data bits have the same logical change, and transmits the selected input end data to the latch 304. In another embodiment, the fault-detecting circuit 302 is a pulse edge detector for detecting the logical change of the output data bit of the first shift register 301. When the fault-detecting circuit 302 reads a sequence of continuous repetitions of logic 1 or logic 0, it detects occurrence of a stuck-open or stuck-short situation or a failure in the transmission. FIG. 3C illustrates one example of such situation. When the transmission line between the data transmission apparatuses 312 and 313 is stuck open, the fault-detecting circuit 302 of the data transmission apparatus 313 will selectively switch to receive data of the second output end $SOUT_2$ of the data transmission apparatus 314, and bypasses failure message from the first output end $SOUT_1$ of the data transmission apparatus 312. In another embodiment, when the data transmission apparatus 31 is powered on, the controller sends a direct initial message propagated from the data transmission apparatus 311 to the data transmission apparatus 314 and an inverse initial message propagated from the data transmission apparatus 314 to the data transmission apparatus 311. When one of the serially-connected data transmission apparatuses fails, the serial input data can locate the failure position by the fault-detecting circuit 302.

In accordance with one embodiment of the present invention, the first input end $SIN_1$ of the data transmission apparatus 313 is used to receive the output data of the first output end $SOUT_1$ of the immediately preceding data transmission apparatus 312. In accordance with one embodiment of the present invention, the first input end $SIN_1$ of the data transmission apparatus 313 is used to receive the output data of the first output end $SOUT_1$ of the two-stage or more preceding data transmission apparatus 311 to increase the fault-tolerance capability of the data transmission apparatus 31. Similarly, the second input end $SIN_2$ of the data transmission apparatus 313 is used to receive output data of the second output end $SOUT_2$ of the two or more succeeding stages of the data transmission apparatus (not shown).

The above-described embodiments of the present invention are intended to be illustrative only. Numerous alternative embodiments may be devised by persons skilled in the art without departing from the scope of the following claims.

What is claimed is:

1. A serial transmission apparatus comprising a plurality of serially-connected data transmission apparatuses, each of the data transmission apparatuses comprising:

a second shift register configured to receive a second serial input signal and generate an output signal in accordance with a clock signal;

a fault-detecting circuit configured to receive an output signal of the second shift register and a first serial input signal, and to select one of the output signal of the second shift register and the first serial input signal in accordance with a fault-detecting result so as to generate an output signal; and a first shift register configured to receive the output signal of the fault-detecting circuit and to generate a serial output signal in accordance with the clock signal;

wherein the second serial input signal is derived from the first serial input signal of a preceding data transmission apparatus, and the first serial input signal is derived from the serial output signal of the immediately preceding data transmission apparatus.

2. The apparatus of claim 1, wherein the data transmission apparatus further comprises a latch configured to latch parallel output signals of the first shift register in accordance with a strobe signal.

3. The apparatus of claim 2, wherein the data transmission apparatus further comprises a strobe-generating circuit configured to output the strobe signal when the clock signal remains at a specific level for a predetermined period.

4. The apparatus of claim 1, wherein the fault detecting circuit is a bit comparator configured to determine whether the output signal of the second shift register and data bit of the first serial input signal have the same logical change.

5. The apparatus of claim 4, wherein if the output signal of the second shift register and the data bit of the first serial input signal do not have the same logical change, the fault detecting circuit selects the output signal of the second shift register.

6. The apparatus of claim 1, wherein the fault detecting circuit is a pulse edge detector configured to detect logical change of the first serial input signal.

7. The apparatus of claim 6, wherein in the absence of any logical change of the first serial input signal, the fault-detecting circuit selects the output signal of the second shift register.

8. The apparatus of claim 2, wherein the parallel output signal is coupled to a light emitting diode unit.

9. A serial transmission apparatus comprising a plurality of serially-connected data transmission apparatuses, each of the data transmission apparatuses comprising:
a first shift register configured to receive a first serial input signal and to generate a serial output signal in accordance with a clock signal;
a second shift register configured to receive a second serial input signal and generate a second serial output signal in accordance with a clock signal; and
a fault-detecting circuit configured to receive the output signals of the first and second shift registers, and to select one of the output signals of the first and second shift registers in accordance with a fault-detecting result so as to generate a serial output signal;
wherein the first serial input signal is derived from the first serial output signal of a preceding data transmission apparatus, and the second serial input signal is derived from the second serial output signal of a succeeding data transmission apparatus.

10. The apparatus of claim 9, wherein the first serial input signal and the second serial input signal are in opposite orders.

11. The apparatus of claim 9, wherein the data transmission apparatus further comprises a latch configured to latch parallel output signals of the fault-detecting circuit in accordance with a strobe signal.

12. The apparatus of claim 11, wherein the data transmission apparatus further comprises a strobe generating circuit configured to output the strobe signal when the clock signal remains at a specific level for a predetermined period.

13. The apparatus of claim 9, wherein the fault detecting circuit is a bit comparator configured to determine whether the output signals of the first and second shift registers have the same logical change.

14. The apparatus of claim 9, wherein the fault detecting circuit is a pulse edge detector configured to detect logical change of the output signals of the first and second shift registers.

15. The apparatus of claim 14, wherein in the absence of any logical change of the output signal of the second shift register, the fault-detecting circuit selects the output signal of the first shift register; in the absence of any logical change of the output signals of the first shift register, the fault-detecting circuit selects the output signal of the second shift register.

16. The apparatus of claim 11, wherein the parallel output signals are coupled to a light emitting diode unit.

17. A method for serially transmitting signals, comprising the steps of:
providing a plurality of serially-connected data transmission apparatuses, wherein each of the data transmission apparatuses includes a first serial data input port and a second serial data input port;
outputting direct serial data from an immediately preceding data transmission apparatus to a first serial data input port of a current data transmission apparatus;
inputting direct serial data from a preceding data transmission apparatus to a second serial data input port of the current data transmission apparatus;
utilizing a fault-detecting circuit to compare data at the first serial data input port and data at the second serial data input port, and selecting data from the first serial data input port or data from the second serial data input port in accordance with the fault-detecting result to generate a serial output signal to act as a serial input signal of the current data transmission apparatus; and
generating parallel output signals by the data transmission apparatus to drive a light emitting diode unit.

18. The method of claim 17, wherein the utilizing step comprises comparing whether data at the first serial data input port and data at the second serial data input port have the same logical change, or determining whether data at the first and second serial data input ports are lacking of any logical change.

19. The method of claim 18, wherein in the absence of any logical change of data at the first serial data input port, the fault-detecting circuit selects data at the second serial data input port; in the absence of any logical change of data at the second serial data input port, the fault-detecting circuit selects data at the first serial data input port.

20. A method for serially transmitting signals, comprising the steps of:
providing a plurality of serially-connected data transmission apparatuses, wherein each of the data transmission apparatuses includes a first serial data input port and a second serial data input port;
forwarding direct serial data from a preceding data transmission apparatus to a first serial data input port of a current data transmission apparatus;
forwarding inverse serial data from a succeeding data transmission apparatus to a second serial data input port of the current data transmission apparatus;
utilizing a fault-detecting circuit to compare data at the first serial data input port and data at the second serial data input port, and selecting data from the first serial data input port or data from the second serial data input port in accordance with the fault-detecting result; and
generating a parallel output signal to drive a light emitting diode unit.

21. The method of claim 20, wherein the utilizing step comprises comparing whether data at the first serial data input port and data at the second serial data input port have the same logical change, or determining whether data at the first serial data input port and data at the second serial data input port are lacking of any logical change.

22. The method of claim 21, wherein in the absence of any logical change of data at the first serial data input port, the fault-detecting circuit selects data at the second serial data input port; in the absence of any logical change of data at the second serial data input port, the fault-detecting circuit selects data at the first serial data input port.

* * * * *